Figure 1:
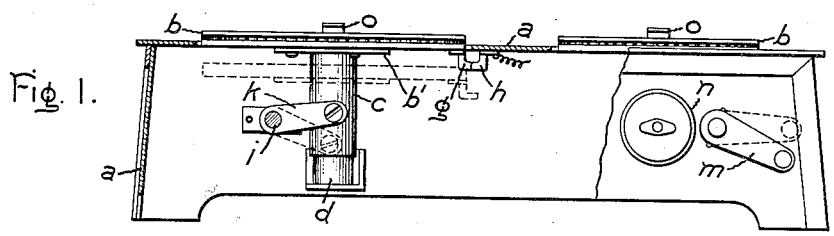

R. SPRENGER.
ELECTRIC COOKING APPARATUS.
APPLICATION FILED APR. 4, 1914.

1,157,731.

Patented Oct. 26, 1915.

Witnesses:
Chas. B Stokes
J. Ellis Glen

Inventor:
Richard Sprenger,
by Albert G. Davis
His Attorney.

UNITED STATES PATENT OFFICE.

RICHARD SPRENGER, OF HENNIGSDORF, NEAR BERLIN, GERMANY, ASSIGNOR TO GENERAL ELECTRIC COMPANY, A CORPORATION OF NEW YORK.

ELECTRIC COOKING APPARATUS.

1,157,731.  Specification of Letters Patent.  Patented Oct. 26, 1915.

Application filed April 4, 1914. Serial No. 829,454.

*To all whom it may concern:*

Be it known that I, RICHARD SPRENGER, a subject of the Emperor of Germany, residing at Hennigsdorf, near Berlin, Germany, have invented certain new and useful Improvements in Electric Cooking Apparatus, of which the following is a specification.

The invention relates to an electric cooking apparatus of the kind in which the cooking utensils are placed on electrically heated plates and receive therefrom the heat necessary for cooking. These plates must have relatively thick casings in order to attain a good storage of heat and further to protect the heater itself from destruction, since if thin casings are used the heating resistances fuse easily. This usually takes place when the heating plates are warmed before use or if the cooking utensil is removed from the plate without the latter being switched off. A plate with thin casing cannot sufficiently store up the heat produced by the heater and the result is a burning out of the overburdened heater and also of the casing itself. This is avoided by thick plates, but the duration of cooking is thereby correspondingly lengthened, and thus the efficiency of the cooking device is diminished. This low efficiency is still further decreased by the fact that the contact with the pans is incomplete as they are placed loosely on the heating plates, and therefore the transmission of heat is unfavorable. These electric cooking devices only possess therefore an efficiency which fluctuates between 50 and 65 per cent.

The invention aims at removing these drawbacks and at attaining an efficiency equal to that of the cooking utensil heated directly. For this purpose the heating plate is arranged so as to be movable upward and is placed under the influence of a powerful spring or of a weight, so that it presses with a certain force against the cooking utensil. At the same time the cooking utensil must be placed on the cooking apparatus in such a way that it forms a firm resistance for the heating plate which is pressed against it. A close contact between the plate and the cooking utensil is hereby obtained, which renders it possible to make the masses surrounding the electric heater or the casing of the heating plate very thin, so that the plate can be quickly brought up to its full capacity and gives off the heat produced to the cooking utensil without any considerable storage taking place. The movability of the heating plate can also be utilized to prevent burning out when a cooking utensil or other heat-receiving body is not situated thereon. This takes place suitably by connecting with the plate or with the parts moving with it a switch device which permits the electric circuit to be closed only when the cooking utensil is in position on the plate. In this manner the electric heater situated in the heating plate and also the plate itself are protected from damage.

One embodiment of the invention is shown in the drawings.

Figure 2:
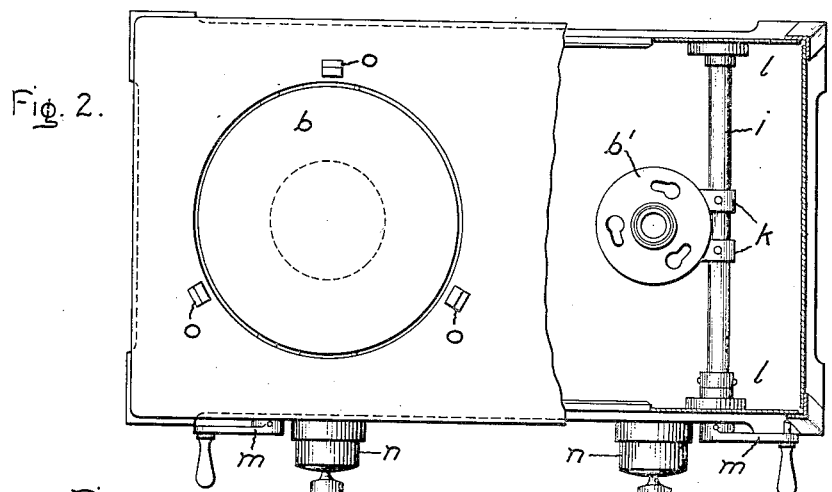
Figure 3:
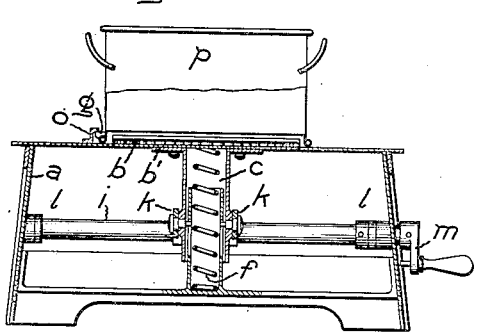
Figure 4:
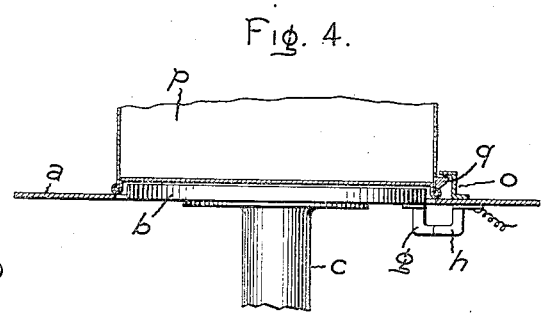
Figure 5:
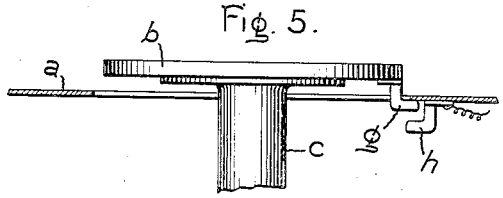
Figure 6:
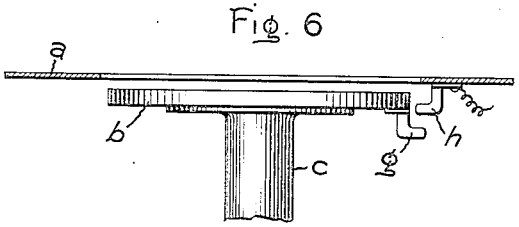

Figure 1 shows, in longitudinal section, partly in side elevation, a cooking apparatus provided with two openings; Fig. 2 is a plan with partially removed top plate and Fig. 3 a cross section, while Figs. 4, 5 and 6 show the heating plate at various heights.

The frame of the cooking apparatus posesses two round openings at the top, in which electric heating plates $b$ are situated. These consist of thin iron plates between which an electrical heat resistance is placed in the usual manner and is divided so as to be able to produce various degrees of heat according as the parts are cut in. For it is necessary to use more heat to bring a liquid to boiling point than for cooking slowly. The plates $b$ rest interchangeably on disks $b'$ which rest by means of sleeves $c$ on sleeves $d$ which are firmly fixed in the frame, the plates being vertically movable. In both sleeves is situated a strong spring $f$, which presses the upper sleeve with the heating plate upward as far as the stops connected with the sleeves permit. Several contact knives $g$ are fixed to the heating plates $b$ and are distributed regularly over their extent, the heat resistances situated in the plates being electrically connected therewith in a suitable manner. Coöperating insulating contacts $h$ are fixed on the frame $a$ and are connected to the supply circuit. At a particular height of the plate the circuit is closed by the contacts $g$ and $h$, while it is interrupted at the lowest and highest positions of the plate. The position of the plate at which the current is closed corresponds to its heating position, in which it is in contact with the bottom of the cooking utensil p. The latter is provided at its lower edge with several, for instance three, stops q at a distance of 120° from each other, which can catch under the stops o that are fixed on the upper plate of the frame. The stops o and q hold the cooking utensil firmly on the cooking apparatus when the heating plate b, under the influence of the spring, presses against the bottom of the cooking utensil from below. Two lever arms k, which are fixed on a shaft i resting in foot bearings l and provided at the exterior end with a handle m, engage each of the sleeves c. This device has the object of holding fast the heating plate in its lowest position. Outside the frame, near the handle m, are placed electric switches n, by which the current in the heating plates can be regulated according to the heat required.

The method of working of the device described is as follows:—Before a cooking utensil is placed on the cooking apparatus, the handle m is turned to the horizontal position indicated on the right-hand side of Fig. 1 by dotted lines, whereby the plate b is lowered in opposition to the spring, f, as shown by the dotted lines on the left side of Fig. 1. Now, as shown in Fig. 3, the cooking utensil is placed on the cooking apparatus over the opening and is turned so that its stops q catch under the fixed stops o, whereby it is held against upward movement. As soon as the handle m is turned downward, the spring f comes into operation and presses the heating plate b firmly against the bottom of the cooking utensil. In this position the knife contacts g, h, close the circuit, as shown in Fig. 4, and the heating of the heating plate b and consequently also the cooking now begin. As the heating plate b is pressed firmly against the bottom of the cooking utensil by means of the spring f, the transmission of heat is good and thereby danger to the heat resistance and to the thin plate casing is avoided.

In order to remove the cooking utensil from the cooking apparatus, it is turned a little so that its stops q are disengaged from the fixed stops o. Then the spring f raises the heating plate b with the cooking utensil p resting thereupon, and the contact knives g are removed from the contact parts h (Fig. 5), so that the current is interrupted and therefore the heat resistance cannot be overloaded. If the cooking utensil is to be set on again this may be done either when the plate is raised, at the same time pressing it down, or the plate may first be lowered by means of the handle m into the position shown in Fig. 6 and then, after placing on the cooking utensil, by turning back the handle it may again be raised against the bottom of the cooking utensil by means of the spring f. The handle thus serves to facilitate the placing in position of the cooking utensil.

The contacts g, h switch the current on and off automatically, according as a heat-receiving cooking utensil is in position or not, and thereby a fusing of the heat resistance is automatically avoided. By means of the movability of the heating plate and by means of the spring, the result is obtained of giving the heating plate as little mass as possible, so that the heat produced by the electric current is given off almost directly to the cooking utensil, whereby a high degree of efficiency of the cooking apparatus is obtained, and by means of the use of the movable heating plate for automatically closing and opening the working circuit an overloading of the heat resistance and a fusing of the heating plate are avoided.

What I claim as new and desire to secure by Letters Patent of the United States, is:

1. An electric heating device comprising a substantially flat top plate provided with an opening, an electrically heated plate yieldingly mounted therein, a cooking utensil, and means for securing said utensil upon said top plate and over said electrically heated plate.

2. An electric heating device comprising a top plate provided with an opening, an electrically heated plate yieldingly mounted therein, a cooking utensil, means for securing said utensil to said top plate over said electrically heated plate, and means for depressing the electrically heated plate.

3. An electric heating device comprising a top plate provided with an opening, an electrically heated plate adapted to pass through said opening, a sleeve secured to said plate, a second sleeve telescoping with the first and mounted on a stationary part of the device, and a spring mounted between the two sleeves whereby the electrically heated plate tends to move without the opening.

4. An electric heating device comprising a top plate provided with an opening, an electric heating plate yieldingly mounted therein, a cooking utensil, means for securing the cooking utensil to the top plate and against the heating plate, and means controlled by the movement of the heating plate for breaking the circuit to the heating device when the cooking utensil is removed.

5. An electric heating device comprising a top plate provided with an opening, an electric heating plate yieldingly mounted therein, a cooking utensil, means for securing the cooking utensil to the top plate and against the heating plate, and means controlled by the heating plate for closing its own circuit when in position against the cooking utensil, and for breaking said circuit when it is substantially moved from said position.

6. An electric heating device comprising a top plate provided with an opening, an electric heating plate yieldingly mounted therein, and movable to positions above and below the top plate, and means associated with said heating plate for closing the circuit thereto when the top surfaces of the heating plate and of the top plate are in substantially the same plane.

7. An electric heating device comprising a top plate provided with an opening, an electric heating plate yieldingly mounted therein and movable to positions above and below said top plate, a cooking utensil, means for securing said utensil to said top plate over said heating plate, and means associated with said heating plate for closing the circuit to the electric heater thereof when the cooking utensil is secured in position on said top plate and the heating plate is seated against the bottom of the same, and for opening said circuit when the heating plate is substantially above or below this position.

In witness whereof, I have hereunto set my hand this 16th day of March, 1914.

RICHARD SPRENGER.

Witnesses:
 HANS BUELER,
 STEPHAN SCHNEIDER.